Sept. 27, 1932.                C. D. STEWART                 1,879,719
                             MOTOR VEHICLE DEVICE
                             Filed Sept. 12, 1927
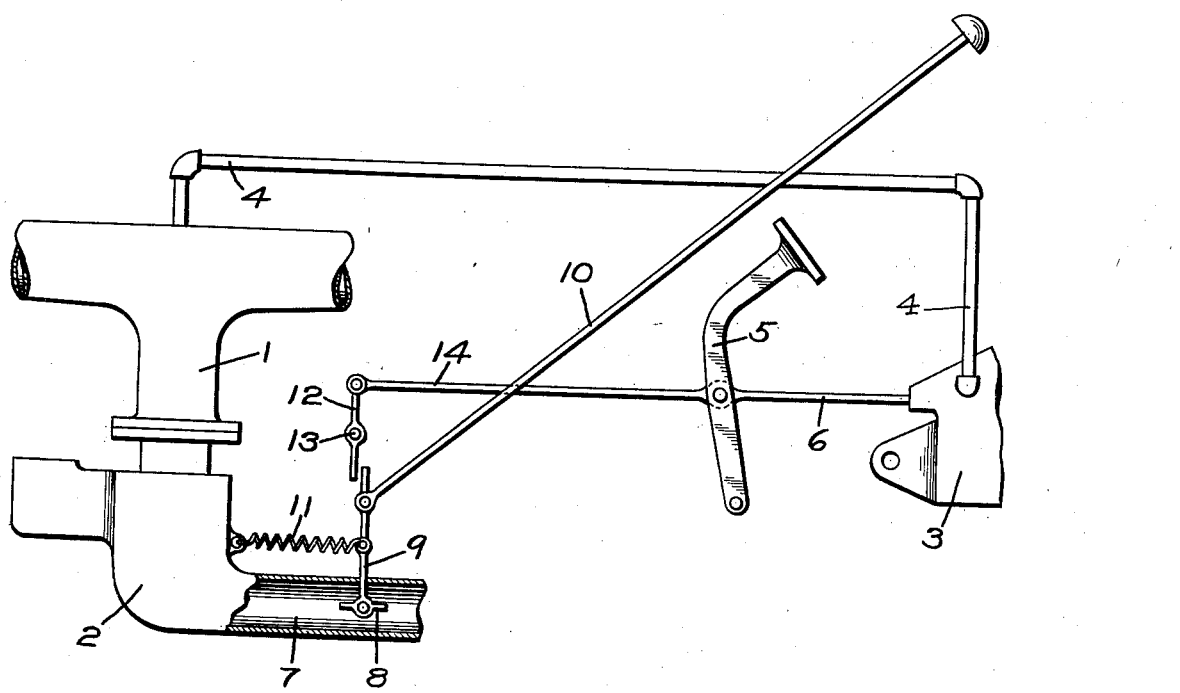
INVENTOR
CARLTON D. STEWART
BY *Wm. N. Cady*
                    ATTORNEY Patented Sept. 27, 1932

1,879,719

UNITED STATES PATENT OFFICE

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

MOTOR VEHICLE DEVICE

Application filed September 12, 1927. Serial No. 219,156.

This invention relates to internal combustion engine driven vehicles, and more to a vehicle of this type in which the vacuum created in the suction manifold of the engine is employed for controlling the vehicle brakes.

Where a vacuum brake unit is connected to the suction manifold of an internal combustion engine, if the brakes are applied while the vehicle is running at a low speed and the engine is turning over slowly, the engine throttle will probably be closed down to idling speed and the fuel mixture may then be so weakened by the air supplied to the manifold from the vacuum brake unit, as to cause the engine to stall.

The principal object of my invention is to provide means for overcoming the above difficulty.

In the accompanying drawing, the single figure is a diagrammatic view of the suction manifold and carburetor of an internal combustion engine, showing my invention applied thereto.

The apparatus shown in the drawing comprises a suction manifold 1 of an internal combustion engine, and a carburetor 2 associated with the manifold in the usual manner. A vacuum brake unit 3 employs the vacuum created in the suction manifold 1 as its vacuum source and for this purpose is connected through pipe 4 to the manifold. For operating the usual controlling valve mechanism (not shown) by which the vacuum brake is operated, a pedal lever 5 is provided, which is connected to the controlling valve mechanism by a rod 6.

The air intake pipe 7 of the carburetor 2 is provided with the usual choke valve 8, having an operating arm 9, which is connected to a rod 10, extending into the interior of the car, so that the rod may be operated by the driver of the vehicle, the arm 9 being connected to a spring 11, which tends to maintain the valve 8 in its normal open position.

According to my invention, the choke valve 8 is also adapted to be automatically operated when the pedal lever 5 is moved to apply the brakes in the vehicle and for this purpose, a lever 12, pivotally fulcrumed on a pin 13 is so disposed that one end of the lever is adapted to engage a projecting end of the arm 9. The other end of the lever is pivotally connected to a rod 14, which in turn is pivotally connected to the pedal lever 5.

In operation, when the brake lever 5 is pushed down to operate the valve mechanism (not shown) for effecting a vacuum brake application, the rod 14 is moved toward the left and the lever 12 is then shifted so that the lower end thereof engages the projecting end of the arm 9. The arm 9 is then operated so as to cause the choke valve 8 to be moved to close the air supply pipe 7.

It will now be seen that when the brakes are applied with the vehicle running at a low speed and with the engine throttle closed down to idling speed, the air supply to the carburetor is automatically cut off, so that even though air may be supplied to the suction manifold through pipe 4, the fuel mixture will not be made too lean by the combined flow of air through the pipe 7 and the pipe 4 and danger that the engine may be stalled is thus obviated.

If the pedal lever 5 is pressed down sufficiently in applying the brakes, the end of the lever 12 will flip past the engaged end of the lever 9 and will thus permit the valve 8 to be moved to open position by the spring 11. This is for the purpose of preventing the valve 8 from being held closed in case the brakes are applied hard for a considerable period of time, since in such case it is not desirable to hold the valve closed.

It is only necessary that the air supply to the carburetor be cut down momentarily during the operation of applying the brakes, since after the brake applying piston or diaphragm has been shifted to the braking position, the further flow of air from the brake to the intake manifold will be only that due to leakage, and particularly if the brake be held applied for a considerable period of time, as while running down hill it is not desirable to hold the choke valve closed, since an excessive amount of gas would then be used.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a carburetor of an internal combustion engine and a valve for controlling the supply of air only to the carburetor, of a brake controlled by the engine vacuum, a brake operating means and means operated by said brake operating means upon its initial movement for closing said valve and upon continued movement for reopening said valve.

2. In a motor vehicle, the combination with a carburetor of an internal combustion engine on the vehicle and a choke valve for controlling the supply of air only to the carburetor, of a brake actuated by the engine vacuum, means for controlling said brake and means controlled by said brake means for closing said valve upon initial movement of said brake operating means and for opening said valve upon continued movement of said brake operating means.

3. In a motor vehicle, the combination with a carburetor of an internal combustion engine on the vehicle and a choke valve for controlling the supply of air only to the carburetor, of a brake controlled by the engine vacuum and a brake pedal lever for controlling said brake and operatively connected to said valve to close the same upon initial movement of said brake pedal lever and to open said valve upon continued movement of said brake pedal lever.

4. In a motor vehicle, the combination with a suction manifold and a carburetor of an internal combustion engine on the vehicle and a valve for controlling the supply of air to the carburetor, of a vacuum operated device, means for connecting said device to the suction manifold, and means operated upon connecting said device to the suction manifold for closing said valve.

5. In a motor vehicle, the combination with a suction manifold and a carburetor of an internal combustion engine on the vehicle and a valve for controlling the supply of air to the carburetor, of a vacuum brake device, means for connecting said device to the suction manifold to create a vacuum on said brake device, and means operated upon connecting said device to the suction manifold for closing said valve.

6. In combination, an internal combustion engine carburetor, a valve for controlling the supply of air and air only to said carburetor, a brake controlled by the engine vacuum, brake applying means, and means operated by said brake applying means in applying the brakes for closing said valve.

7. In a motor vehicle, the combination with a carburetor of an internal combustion engine on the vehicle and a valve for controlling the supply of air to the carburetor, of means for operating the brakes on the vehicle, means controlled by said brake operating means for operating said valve, said valve being closed upon the initial movement of said brake operating means and being permitted to open upon a further movement of said brake operating means.

In testimony whereof I have hereunto set my hand.

CARLTON D. STEWART.